June 13, 1967 F. FINNEGAN ET AL 3,324,674
REFRIGERATION CONTROL APPARATUS
Filed Jan. 3, 1966 2 Sheets-Sheet 1
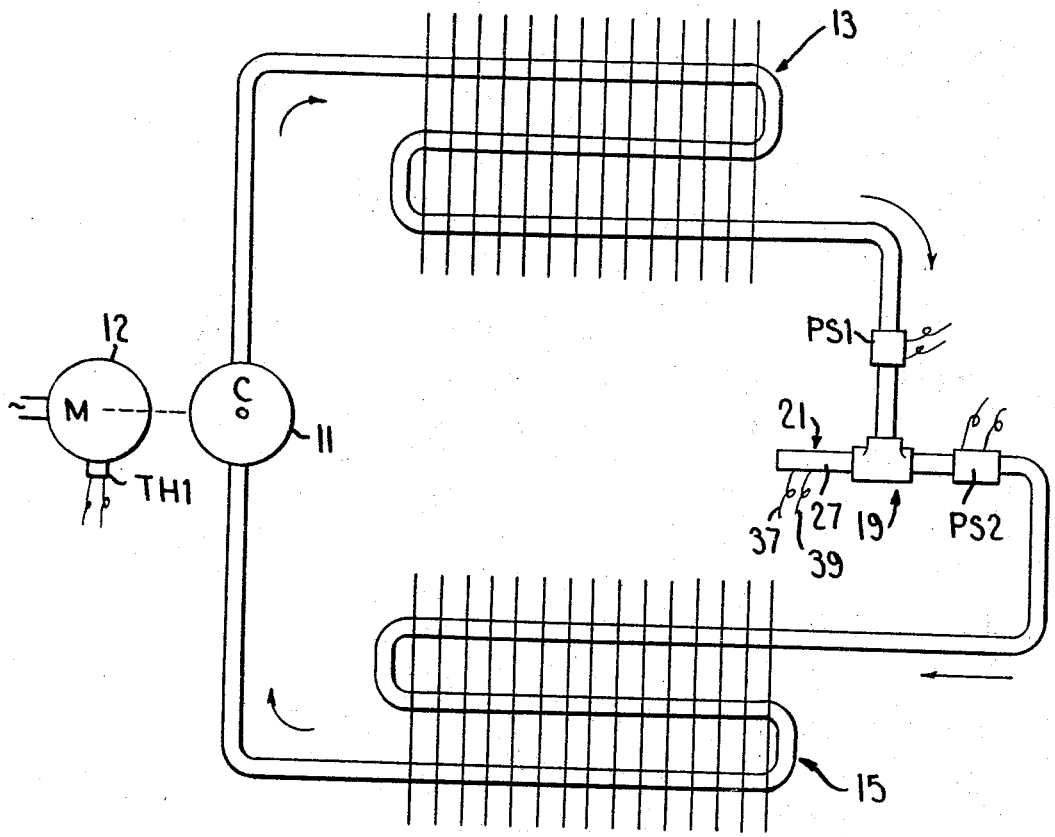
FIG. I.
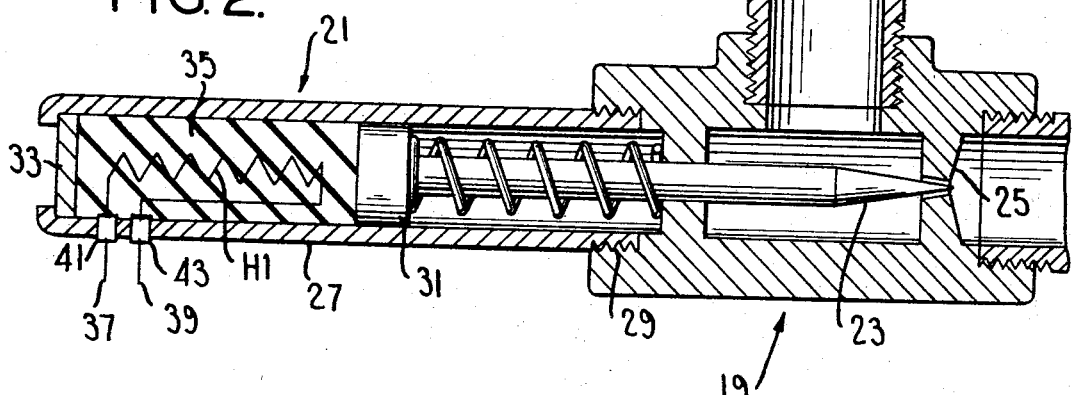
FIG. 2.
Francis Finnegan and
Frederick P. Stearns,
Inventors.
Koenig, Senniger, Powers and Leavitt,
Attorneys.

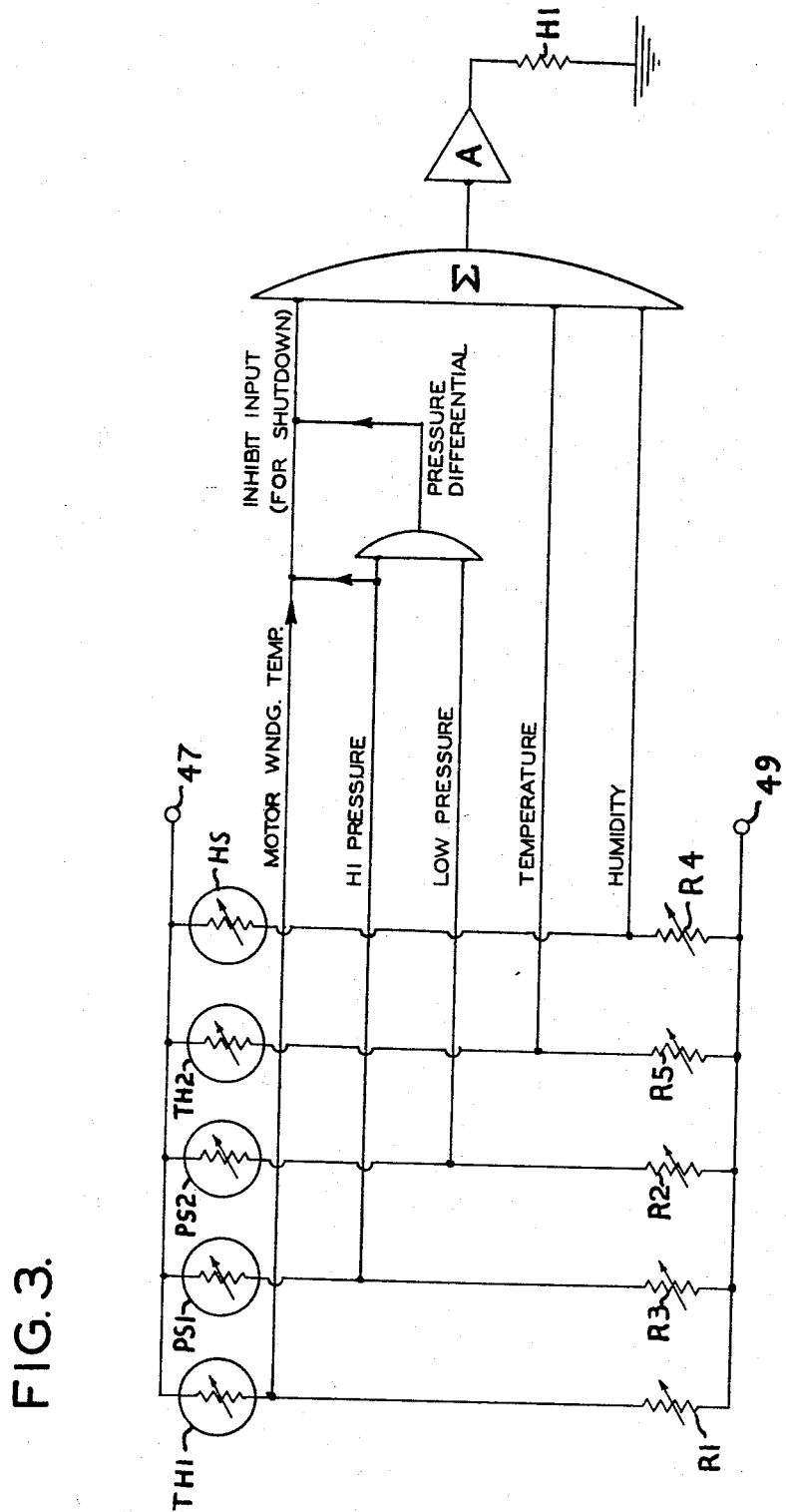

United States Patent Office 3,324,674
Patented June 13, 1967

3,324,674
REFRIGERATION CONTROL APPARATUS
Francis Finnegan, Plainville, Mass., and Frederick P. Stearns, Birmingham, Mich., assignors to Texas Instruments Incorporated, Dallas, Tex., a corporation of Delaware
Filed Jan. 3, 1966, Ser. No. 518,128
10 Claims. (Cl. 62—204)

This invention relates to refrigeration control apparatus and more particularly to such apparatus and more particularly to such apparatus whcih will automatically vary the amount of cooling provided by a refrigeration system in response to variations in a preselected parameter.

Among the several objects of the present invention may be noted the provision of automatic control apparatus for a refrigeration system, which apparatus will continuously vary the amount of cooling provided by the system in response to variations in a preselected parameter, e.g. ambient or room temperature; the provision of such control apparatus which is responsive to a plurality of different variable parameters; the provision of such apparatus including a novel refrigerant valve and actuator; the provision of such apparatus which consumes little power; the provision of such apparatus which is highly reliable; and the provision of such apparatus which is simple and relatively inexpensive. Other objects and features will be in part apparent and in part pointed out hereinafter.

Briefly, control apparatus according to the present invention is responsive to variations in a preselected parameter for automatically varying the amount of cooling provided by a refrigeration system of the type including means defining a refrigeration cycle flow path for a refrigerant and means for driving a refrigerant around the path to produce cooling. The control apparatus includes a continuously adjustable valve in the refrigerant flow path for varying the refrigerant flow. The valve is operated by an actuator which includes a piston and cylinder and a filling for the cylinder having a temperature coefficient of expansion which is substantially different from that of the cylinder. An electric heater is provided for heating the material to produce relative movement between the cylinder and piston for operating the valve, the setting of the valve being a function of the energization of the heater. The apparatus further includes means for obtaining an electrical signal which varies as a function of the preselected parameter and amplifier means for energizing the heater to an extent which is a function of the signal. Accordingly, the amount of cooling provided by the refrigeration system is automatically varied by the valve in response to variations in the parameter.

The invention accordingly comprises the apparatus hereinafter described, the scope of the invention being indicated in the following claims.

In the accompanying drawings in which one of various possible embodiments of the invention is illustrated, FIG. 1 is a diagrammatic illustration of a refrigeration system embodying the present invention including an electrically operated, continuously adjustable valve in the refrigerant flow path;

FIG. 2 is a side view in section of the valve employed in the FIG. 1 system and;

FIG. 3 is a diagrammatic illustration of a control circuit for operating the valve of FIGS. 1 and 2.

Corresponding reference characters indicate corresponding parts throughout the several views of the drawings.

Referring now to FIG. 1 there is indicated at 11 a conventional refrigeration compressor. Compressor 11 circulates refrigerant through a conventional refrigeration cycle including passage through a condenser 13 and an evaporator 15. Compressor 11 is driven by an electric motor 12 which is provided with a thermistor sensor TH1 for detecting overheating of the motor, such as may be caused by overloading or by a locked rotor condition. An adjustable expansion valve 19 is located in the refrigerant flow path between condenser 13 and evaporator 15 for varying the flow of refrigerant. Valve 19 is operated by an electrical actuator indicated generally at 21. A pair of pressure sensors PS1 and PS2 are provided at the inlet and outlet respectively of valve 19 to sense the pressures at these points for a purpose described in greater detail hereinafter. Pressure sensors PS1 and PS2 are electrical sensors having a resistance which varies as function of the sensed pressure.

As may be seen in FIG. 2, valve 19 is of the needle valve type and includes a conically tapered plunger or rod 23 and a seat 25 which mates with the tapered portion of the rod. Rod 23 and its seat 25 present a restricted orifice to the flow of refrigerant from the inlet to the outlet the size of which may be adjusted by axial movement of the rod thereby to vary the flow of refrigerant between condenser 13 and evaporator 15.

Actuator 21 includes a cylinder 27 which screws into valve 19 as at 29 and a piston 31 which slides within cylinder 27 and which is coupled directly to the end of rod 23. The end of cylinder 27 opposite the valve 19 is closed by a plug 33. The space within cylinder 27 between plug 33 and piston 31 is occupied by a filling 35 of a material having a temperature coefficient of expansion which is substantially different from and preferably much greater than that of the cylinder. A preferred material for filling 35 is silicone rubber in solid phase. An example of such a rubber material is that sold under the trademark "Silastic 152" by the Dow Corning Corporation. This material provides high tensile strength and tear resistance so that sealing problems are minimized. It is also capable of substantially volumetric expansion within the confines of cylinder 35 to displace piston 31. Piston 31 is urged to the left by a spring 36 thereby maintaining filling 35 under compression.

Within filling 35 is imbedded an electrical resistance heater H1. A pair of leads 37 and 39 enter cylinder 27 through sealed insulator bushings 41 and 43 and are attached to the ends of heater H1. When power is applied through leads 37 and 39 to energize heater H1, filling 35 is warmed and expands thereby driving piston 31 toward valve 19. Piston 31 drives the tapered rod 23 toward its seat 25 thereby restricting the metering valve orifice. The setting of the valve, i. e. the size of the orifice, is therefore a function of the energization of heater H1. Since the valve 19 is operative to continuously vary the flow of refrigerant in the system of FIG. 1, the amount of cooling provided by the system can be adjusted by varying the energization of heater H1.

In air-conditioning applications using the refrigeration system of FIG.1, it is typically desired to maintain room or ambient temperature at a preselected level. Room temperature is conveniently sensed by a thermistor, the resistance of which varies appreciably with temperature in the desired range. Such a thermistor sensor is indicated at TH2 in FIG. 3. It is also typically desirable to control the amount of refrigeration provided in response to humidity conditions. In FIG. 3 there is indicated at HS1 a humidity sensor of the surface ionization type which varies in resistance as humidity changes. The room temperature sensing thermistor TH2, humidity sensor HS, the two pressure sensors PS1 and PS2, and the motor temperature sensing thermistor TH1 are interconnected in respective voltage dividers with respective reference resistances. The reference resistances are constituted by rheostats R1–R5. A preselected voltage is applied across each of the dividers by means of terminals 47 and 49 to which the dividers are commonly connected.

As is understood by those skilled in the art, the voltage at the junction between each sensor and its respective reference resistance varies as a function of the resistance of the sensor. These variable voltages are applied to mixing networks M and N to obtain a single signal. An inhibiting input is derived from the motor winding temperature signal and the pressure signals to shut down the system under abnormal operating conditions. The several input channels to network N are adjusted as to sensitivity and threshold of response so that each sensed parameter affects the network output voltage according to preselected function corresponding to the variations in cooling capacity desired for given changes in that sensed parameter. The output signal from network N is amplified by an amplifier A to provide a signal at a power lever appropriate for energizing heater H1. The amount of power actually required is relatively small as compared with typical solenoid operated valves.

In operation, the setting of valve 19 is thus automatically adjusted by actuator 21 in response to variations in the weighted average signal obtained from mixing network N so that this weighted average signal is maintained substantially at a preselected level. This control system thus provides a servo loop control which is responsive to the weighted average of the several sensed parameters. Typically, netword N is adjusted so that the room temperature sensing thermistor TH2 and the humidity sensor HS exercise substantially exclusive control over most of the available range of cooling control, the pressure sensors PS1 and PS2 and the motor temperature sensing thermistor TH1 being operative only to establish preselected limits of operation which protect the refrigeration system from damaging or inefficient operation.

While control in response to a plurality of sensed variable parameters has been illustrated, it should be understood that apparatus according to the invention may be operated in response to variations in a single parameter, e. g. ambient temperature. In such situations, the network N may be omitted, and the voltage signal obtained from thermistor TH2 may be amplified directly to energize heater H1 thereby modulating the cooling capacity to maintain the ambient temperature substantially at a preselected level.

In view of the above, it will be seen that the several objects of the invention are achieved and other advantageous results obtained.

As various changes could be made in the above apparatus without departing from the scope of the invention, it is intended that all matter contained in the above description or shown in the accompanying drawings shall be interpreted as illustrative and not in a limiting sense.

What is claimed is:

1. In a refrigeration system including means defined a refrigeration cycle flow path for a refrigerant and means for circulating a refrigerant around said path, control apparatus for automatically varying the amount of cooling provided by said system in respense to variations in a preselected parameter, said control apparatus comprising:
    a continuously adjustable valve in said refrigerant flow path for varying the refrigerant flow;
    an actuator including a piston and cylinder for operating said valve, said actuator including also a filling for said cylinder of a material having a temperature coefficient of expansion which is substantially different from that of said cylinder and an electric heater for heating said material to produce relative movement between said cylinder and said piston for operating said valve, the setting of said valve being a function of the energization of said heater;
    means for obtaining an electrical signal which varies as as function of said preselected parameter; and
    amplifier means for energizing said heater to an extent which is a function of said signal whereby the amount of cooling provided by said system is automatically varied in response to variations in said parameter.

2. Apparatus as set forth in claim 1 in which said means for obtaining an electric signal includes a thermistor for sensing the temperature of the space being refrigerated by said system.

3. Apparatus as set forth in claim 1 in which said filling comprises a mass of silicone synthetic rubber in solid phase.

4. Apparatus as set forth in claim 3 wherein said actuator includes spring means for biasing said piston into said cylinder to maintain said filling under compression.

5. Apparatus as set forth in claim 1 in which said refrigeration flow path includes a condenser and an evaporator and said valve is interposed between said condenser and said evaporator.

6. Apparatus as set forth in claim 1 including a plurality of sensors for obtaining respective electrical signals which vary in response to variations in respectively sensed parameters and including also a mixing network for providing to said amplifier means a signal which is a weighted average of the signals obtained from said sensors whereby the amount of cooling provided by said refrigeration system is automatically varied in response to variations in each of said parameters.

7. Apparatus as set forth in claim 6 wherein one of said sensors provides a signal which varies as a function of the relative humidity in the space being refrigerated by said system.

8. Apparatus as set forth in claim 6 wherein a pair of said sensors provide respective signals which vary as functions of the refrigerant pressure on the inlet and outlet sides of said valve respectively.

9. Apparatus as set forth in claim 6 in which said refrigeration system includes a compressor driven by an electric motor and one of said sensors provides a signal which varies as a function of the temperature of said motor thereby preventing overloading thereof.

10. In a refrigeration system for cooling a preselected space, said system having means defining a refrigeration cycle flow path for a refrigerant, said means including a condenser and an evaporator, said system having also a motor driven compressor for circulating a refrigerant around said path; control apparatus for automatically varying the amount of cooling provided by said system to maintain the temperature in said space substantially at a preselected level, said control apparatus comprising:
    a continuously adjustable valve in said refrigerant flow path between said condenser and said evaporator for varying the refrigerant flow;
    an actuator including a piston and cylinder for operating said valve, said actuator including also a filling for said cylinder of a material having a temperature coefficient of expansion which is substantially greater than that of said cylinder and an electric heater for heating said material to produce relative movement between said cylinder and said piston for operating said valve, the setting of said valve being a function of the energization of said heater;
    a thermistor for sensing the temperature in said space;
    means for passing current through said thermistor to obtain an electric signal which varies as a function of said temperature; and
    amplifier means for energizing said heater to an extent which is a function of said signal whereby the amount of cooling provided by said system is continually automatically varied to maintain the temperature in said space at said preselected level.

References Cited

UNITED STATES PATENTS

| | | | |
|---|---|---|---|
| 2,297,872 | 10/1942 | Carter | 62—212 |
| 2,564,421 | 8/1951 | Carter | 62—211 |
| 2,893,638 | 7/1959 | Rimsha | 62—202 |

MEYER PERLIN, *Primary Examiner.*